US008893257B2

(12) United States Patent
Xie

(10) Patent No.: US 8,893,257 B2
(45) Date of Patent: *Nov. 18, 2014

(54) FIREWALL INTERFACE CONFIGURATION TO ENABLE BI-DIRECTIONAL VOIP TRAVERSAL COMMUNICATIONS

(71) Applicant: Fortinet, Inc., Sunnyvale, CA (US)

(72) Inventor: Michael Xie, Palo Alto, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,830

(22) Filed: Apr. 8, 2014

(65) Prior Publication Data

US 2014/0223540 A1 Aug. 7, 2014

Related U.S. Application Data

(63) Continuation of application No. 13/873,895, filed on Apr. 30, 2013, which is a continuation of application No. 13/491,346, filed on Jun. 7, 2012, now Pat. No. 8,434,143, which is a continuation of application No. 13/229,134, filed on Sep. 9, 2011, now Pat. No. 8,201,236, which is a continuation of application No. 12/776,415, filed on May 9, 2010, now Pat. No. 8,020,202, which is a continuation of application No. 10/247,955, filed on Sep. 20, 2002, now Pat. No. 7,716,725.

(51) Int. Cl.
*H04L 29/06* (2006.01)
*H04L 29/12* (2006.01)

(52) U.S. Cl.
CPC .......... *H04L 63/029* (2013.01); *H04L 61/1529* (2013.01); *H04L 29/12094* (2013.01); *H04L 69/22* (2013.01); *H04L 65/1009* (2013.01); *H04L 65/1043* (2013.01); *H04L 29/06027* (2013.01); *H04L 65/1006* (2013.01)
USPC ............................................. 726/13; 709/231

(58) Field of Classification Search
None
See application file for complete search history.

(56) References Cited

U.S. PATENT DOCUMENTS 6,240,513 B1 5/2001 Friedman et al.
6,674,758 B2 1/2004 Watson (Continued)

FOREIGN PATENT DOCUMENTS

EP 1178658 2/2002

OTHER PUBLICATIONS

Notice of Allowance for U.S. Appl. No. 12/776,415 mailed Jul. 29, 2011.

(Continued)

*Primary Examiner* — Michael R Vaughan
(74) *Attorney, Agent, or Firm* — Hamilton, DeSanctis & Cha LLP

(57) ABSTRACT

Methods and systems for an intelligent network protection gateway (NPG) and network architecture are provided. According to one embodiment, a firewall provides network-layer protection to internal hosts against unauthorized access by hosts of an external network by performing network address translation (NAT) processing of Internet Protocol (IP) addresses. The firewall changes data in headers of VoIP packets and corresponding data contents of the VoIP packets, to enable bi-directional VoIP communications. An external VoIP interface of the firewall receives incoming VoIP packets having a user alias (e.g., an email address) and an indication regarding a VoIP port of external interface. The packets are directed to an appropriate internal host by the firewall performing port address forwarding based on the port indication to an appropriate media gateway within the internal network that maintains a mapping of user aliases to private addresses of the internal hosts.

19 Claims, 8 Drawing Sheets

(56) References Cited

U.S. PATENT DOCUMENTS

| | | | |
|---|---|---|---|
| 6,687,245 | B2 | 2/2004 | Fangman et al. |
| 6,697,377 | B1 | 2/2004 | Ju et al. |
| 6,772,210 | B1 * | 8/2004 | Edholm .................. 709/226 |
| 6,772,347 | B1 | 8/2004 | Xie et al. |
| 6,981,278 | B1 | 12/2005 | Minnig et al. |
| 7,006,436 | B1 * | 2/2006 | Chu et al. .................. 370/230 |
| 7,016,343 | B1 | 3/2006 | Mermel et al. |
| 7,046,558 | B2 | 5/2006 | Tanaka |
| 7,047,561 | B1 * | 5/2006 | Lee .................................. 726/12 |
| 7,050,396 | B1 | 5/2006 | Cohen et al. |
| 7,072,332 | B2 | 7/2006 | D'Souza |
| 7,085,260 | B2 | 8/2006 | Karaul et al. |
| 7,100,202 | B2 | 8/2006 | Bakke |
| 7,159,031 | B1 | 1/2007 | Larkin et al. |
| 7,239,629 | B1 * | 7/2007 | Olshansky et al. ........... 370/353 |
| 7,254,832 | B1 | 8/2007 | Christie |
| 7,274,684 | B2 * | 9/2007 | Young et al. .................. 370/352 |
| 7,480,305 | B1 * | 1/2009 | Somasundaram ............ 370/401 |
| 7,716,725 | B2 | 5/2010 | Xie |
| 7,797,433 | B2 * | 9/2010 | Kennedy et al. .............. 709/229 |
| 8,020,202 | B2 | 9/2011 | Xie |
| 8,201,236 | B2 | 6/2012 | Xie |
| 2001/0004361 | A1 | 6/2001 | Kobayashi |
| 2002/0015418 | A1 | 2/2002 | Uemura |
| 2002/0024943 | A1 | 2/2002 | Karaul et al. |
| 2002/0111998 | A1 | 8/2002 | Kim |
| 2002/0120760 | A1 | 8/2002 | Kimchi et al. |
| 2002/0167937 | A1 | 11/2002 | Goodman |
| 2002/0167946 | A1 | 11/2002 | Gallant |
| 2002/0186685 | A1 | 12/2002 | O'Brien et al. |
| 2002/0196776 | A1 | 12/2002 | Chiang |
| 2003/0007482 | A1 | 1/2003 | Khello et al. |
| 2003/0007496 | A1 | 1/2003 | Brown et al. |
| 2003/0007621 | A1 | 1/2003 | Graves et al. |
| 2003/0018814 | A1 | 1/2003 | Kao et al. |
| 2003/0033418 | A1 * | 2/2003 | Young et al. .................. 709/230 |
| 2003/0046400 | A1 * | 3/2003 | Friel et al. ...................... 709/228 |
| 2003/0058839 | A1 | 3/2003 | D'Souza |
| 2003/0091046 | A1 | 5/2003 | Fang et al. |
| 2003/0093563 | A1 * | 5/2003 | Young et al. .................. 709/245 |
| 2003/0161295 | A1 * | 8/2003 | Shah et al. .................... 370/352 |
| 2003/0227903 | A1 * | 12/2003 | Watson ......................... 370/352 |
| 2004/0028028 | A1 | 2/2004 | Kwak |
| 2005/0089052 | A1 | 4/2005 | Chen et al. |
| 2012/0005741 | A1 | 1/2012 | Xie |

OTHER PUBLICATIONS

Notice of Allowance for U.S. Appl. No. 10/247,955 mailed Feb. 2, 2010.

Notice of Allowance for U.S. Appl. No. 13/229,134 mailed May 4, 2012.

H Sinnreich Ed. S. Lass C. Stredicke, SIP Telephoney Device Requirement and configuration (RFC4504), May 1, 2006, 'MVW.ip.com pp. 1-39.

Pin Nie, A security Architecture for Session Initiation Protocol, Mar. 2006, Helsinki University of Technology, Master's Thesis, pp. 1-79.

Bur Goode, Voice Over Internet Protocol (VoIP), Sep. 202, IEEE, vol, 90. No. 9, pp. 1-23.

PF: Redirection (Port Forwarding) OpenBSD, http://www.opebsd.org/faq/pf/rdr/html. 5 pages.

Port Forwarding—wikipedida, the free encyclopedia. http://en.wikipedia.org/wiki/Port_forwarding. 3 pages.

Network address translation—Wikipedia the free encyclopedia. http://en.wikipedia.org/wiki/Network_address_translation. 10 pages.

David. "Davis CCIE, MCSE +, SCSA" Set up Port Address Translation (PAT) in the Cisco IDS. http://articles.techrepublic.com/5100-10878_11-1053789.html. 7 pages.

* cited by examiner

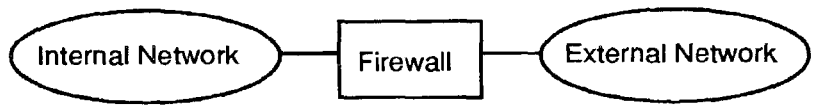
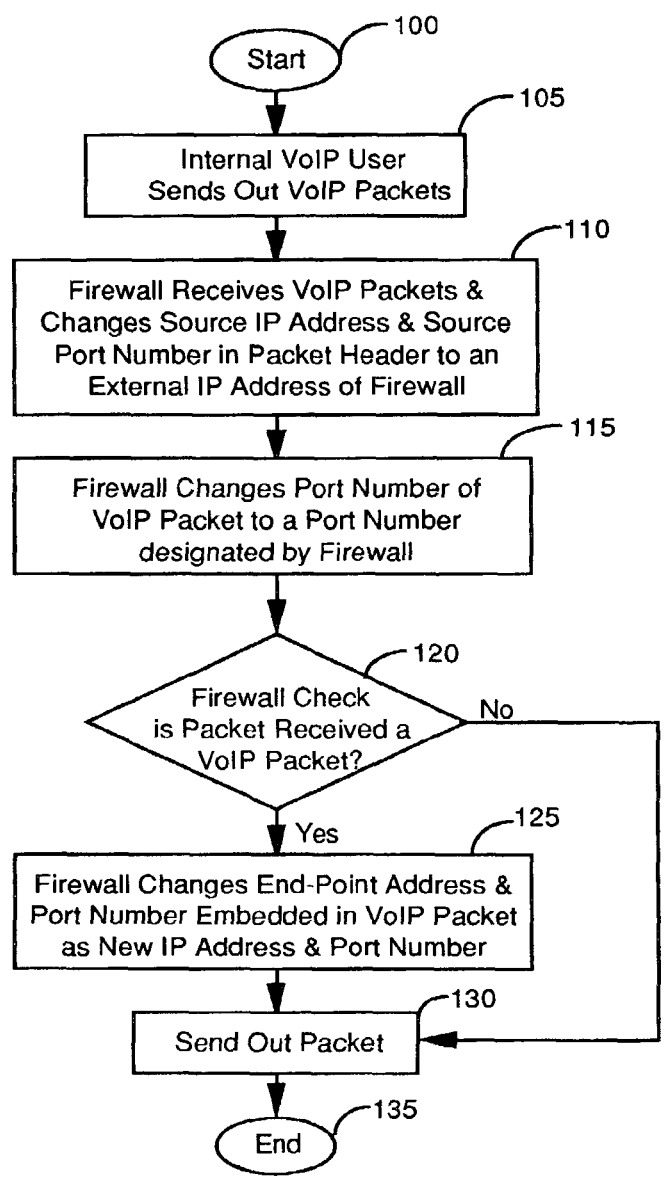
FIG. 1
FIG. 2

| (HEADER) SOURCE IP | SOURCE PORT | DESTINATION IP | DESTINATION PORT |
|---|---|---|---|
| 192.168.1.10 | 2427 | 64.58.79.231 | 1720 |
| MESSAGE BODY | | | |
| ......<br><br>SOURCE IP: 192.168.1.10<br>SOURCE PORT: 2427<br>...<br>ALIAS = LISA.KELLY@LEBEIS.COM<br>... | | | |

FIGURE 5E

| (HEADER) SOURCE IP | SOURCE PORT | DESTINATION IP | DESTINATION PORT |
|---|---|---|---|
| 205.10.10.10 | 10000 | 64.58.79.231 | 1720 |
| MESSAGE BODY | | | |
| ......<br><br>SOURCE IP: 192.168.1.10<br>SOURCE PORT: 2427<br>...<br>ALIAS = LISA.KELLY@LEBEIS.COM<br>... | | | |

FIGURE 5F

| (HEADER) SOURCE IP | SOURCE PORT | DESTINATION IP | DESTINATION PORT |
|---|---|---|---|
| 205.10.10.10 | 10000 | 64.58.79.231 | 1720 |
| MESSAGE BODY | | | |
| ......<br><br>SOURCE IP: 205.10.10.10<br>SOURCE PORT: 10000<br>...<br>ALIAS = LISA.KELLY@LEBEIS.COM<br>... | | | |

FIGURE 5G

| (HEADER) SOURCE IP | SOURCE PORT | DESTINATION IP | DESTINATION PORT |
|---|---|---|---|
| 64.58.79.231 | 1720 | 205.10.10.10 | 10000 |
| MESSAGE BODY | | | |
| ......<br><br>SOURCE IP: 64.58.79.231<br>SOURCE PORT: 1720<br>...<br>CALL HOST ALIAS = ANDY.HUANG@OCSIC.COM<br>CALL PARTICIPANT ALIAS = LISA.KELLY@LEBEIS.COM<br>... | | | |

FIGURE 5H

| (HEADER) SOURCE IP | SOURCE PORT | DESTINATION IP | DESTINATION PORT |
|---|---|---|---|
| 192.168.1.10 | 5005 | 64.58.79.231 | ... |
| MESSAGE BODY | | | |
| ......<br>SOURCE IP: 192.168.1.10<br>SOURCE (RTP) PORT: 5005<br>... | | | |

FIGURE 5I

| SOURCE IP | SOURCE PORT | TRANSLATED IP | TRANSLATED PORT |
|---|---|---|---|
| 192.168.1.10 | 5005 | 205.10.10.10 | 10000 |
| ... | ... | ... | ... |

FIGURE 5J

| (HEADER) SOURCE IP | SOURCE PORT | DESTINATION IP | DESTINATION PORT |
|---|---|---|---|
| 205.10.10.10 | 10000 | 64.58.79.231 | ... |
| MESSAGE BODY | | | |
| ......<br>SOURCE IP: 205.10.10.10<br>SOURCE (RTP) PORT: 10000<br>... | | | |

FIGURE 5K

FIREWALL INTERFACE CONFIGURATION TO ENABLE BI-DIRECTIONAL VOIP TRAVERSAL COMMUNICATIONS

CROSS-REFERENCE TO RELATED APPLICATIONS

This application is a continuation of U.S. patent application Ser. No. 13/873,895, filed Apr. 30, 2013, which is a continuation of U.S. patent application Ser. No. 13/491,346, filed Jun. 7, 2012, now U.S. Pat. No. 8,434,143, which is a continuation of U.S. patent application Ser. No. 13/229,134, filed Sep. 9, 2011, now U.S. Pat. No. 8,201,236, which is a continuation of U.S. patent application Ser. No. 12/776,415, filed May 9, 2010, now U.S. Pat. No. 8,020,202, which is a continuation of U.S. patent application Ser. No. 10/247,955, filed Sep. 20, 2001, now U.S. Pat. No. 7,716,725, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2002-2014, Fortinet, Inc.

BACKGROUND

1. Field

Embodiments of the present invention generally relate to the management and processes of the network communication packet implemented with a firewall. More particularly, embodiments of the present invention relate to a new interface configuration and processing scheme for enhancing bi-directional VoIP communication traversing the firewall without degrading the level of protections provided by the firewall.

2. Description of the Related Art

A technical difficulty is still faced by those who apply Internet Protocol (IP) for voice communication by sending voice messages as digitized data packets on Internet, commonly known as Voice over IP (VoIP) technologies, when the sender or the receiver are protected by a firewall protection system. Specifically, several popular VoIP signaling protocols such as MGCP, SIP and H323 are commonly implemented. All these different types of protocols are implemented with the data relating to the end point address embedded as part of the data content transmitted in the Internet Protocol packets. Referring to FIG. 1 for a typical firewall setup where the firewall is installed as a protection interface between the internal and external networks for preventing invasions of undesirable transmission between the internal and external networks. A conventional firewall employs a network address translation (NAT) technique to change the IP packet header such that all outgoing packets from the internal network are presented to the external network as if there are sent out from the firewall. However, once the sender's identification, i.e., the source IP address and port number of the sender, is translated and changed by the firewall, a return packet in response to the sender's VoIP packets can only return to the firewall and would be unable to reach the sender. The communication loop is broken due to the operation of the firewall in changing the source IP and the source port numbers. For a packet sent from the internal network to the external network through the firewall, it would typically include the header information of source IP address, protocol type, source port number, destination IP address and destination port number. An exemplary header is shown below:

An exemplary header is shown below:
Source IP: 192.168.100.1
Protocol: UDP
Source port: 1025
Destination IP: 10.1.2.3
Destination port: 2727

After the packet is processed by the firewall, the header data is changed and an example of the changed header is shown below:

Source IP: firewall's external IP address
Protocol: UDP
Source port: allocated by the firewall (for example 3330)
Destination IP: 10.1.2.3
Destination port: 2727

For the security of the network user protected by the firewall, the sender's IP address is therefore changed and hidden from the external network. It is noticed that the destination IP and port number are not changed. The same IP address and port number maybe included in the content of the IP packets too. Specifically, a valid SIP request must contain the following header fields: To, From, CSeq, Call-ID, Max-Forwards, and Via; all of these header fields are mandatory in all SIP requests. Call-ID in this case includes a port number and IP address (or domain name) of an end point. For the outbound traffic, i.e., IP packets transmitted from the internal private network to an external public network, because the conventional firewall only changes the packet header, the end point address embedded in the packet content still points to the original IP addresses and the embedded IP address will be mismatched with the header now changed by the firewall. Due to the mismatches, the VoIP communication cannot be successful. Furthermore, for the inbound VoIP communications, because the internal host's IP addressees are hidden from the public network, VoIP traffic when designate the IP address and the port number of an internal IP address cannot reach individual end point by their IP address, thus an incoming call cannot be made. Additionally, even a special assignment is made to correlate a port number with an end point of an internal user, since for each specific protocol, the port number is fixed, for example port 2427 is for MGCP, and 2543 is for SIP. So in a conventional firewall for the management of incoming traffic, if a packet is targeting port 2427, it usually is a call. However, since only one port is used, a call can only be made to one end point inside firewall using the conventional method.

In summary, VoIP is a major enabler of high-value, converged voice/data applications. However, widespread use of VoIP is at odds with conventional security technology: Network-level devices, such as NAT gateways, lack the intelligence to recognize and properly process the critical signaling protocols that enable VoIP calls to be established and managed. Until now, extreme compromises have been required to enable flexible VoIP applications: Companies have been forced to either compromise their security, by opening holes in their perimeter security to allow VoIP signaling to pass, or have been forced to purchase expensive, single-function call-proxy systems that focus on solving the NAT traversal problem. Another approach—using VoIP only in conjunction with VPN tunnels—greatly limits the reach of Internet telephony. None of these so-called solutions achieves the goal of enabling widespread, secure use of VoIP technology.

Since there is an increase in adopting voice over IP technology in the enterprise environment spawning from renewed interest in converged voice/data application, there is an urgent need to resolve the difficulties. Particularly, as most conventional network security technologies employ the network address translation (NAT) technique as a universal standard to prevent unauthorized access to a private network from the Internet, these difficulties often force organizations to either comprise security or forsake the voice/data convergence because such applications have become impractical.

Therefore, a need still exits in the art to provide improved firewall systems with more intelligent operations capable of managing both VoIP and non-VoIP network communications in order to resolve these difficulties.

SUMMARY

Methods and systems are described for an intelligent network protection gateway and network architecture. According to one embodiment, a firewall provides network-layer protection to internal hosts against unauthorized access by hosts of an external network by performing network address translation (NAT) processing of Internet Protocol (IP) addresses. The firewall changes data in headers of VoIP packets and corresponding data contents of the VoIP packets, to enable bi-directional VoIP communications. An external VoIP interface of the firewall receives incoming VoIP packets having a user alias (e.g., an email address) and an indication regarding a VoIP port of external interface. The packets are directed to an appropriate internal host by the firewall performing port address forwarding based on the port indication to an appropriate media gateway within the internal network that maintains a mapping of user aliases to private addresses of the internal hosts.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 1 illustrates a system configuration of a network system including a firewall installed between an internal and external networks for protecting and controlling the interfaces between the internal and external networks;

FIG. 2 is a flow chart showing the processing steps carried out by a firewall to provide corrected end point IP addresses and port numbers sent out by the firewall according to an embodiment of the present invention;

FIGS. 5A to 5K are screen display illustrations and IP address tables for showing the processes according to an embodiment of the present invention.

DETAILED DESCRIPTION

Figure 3:
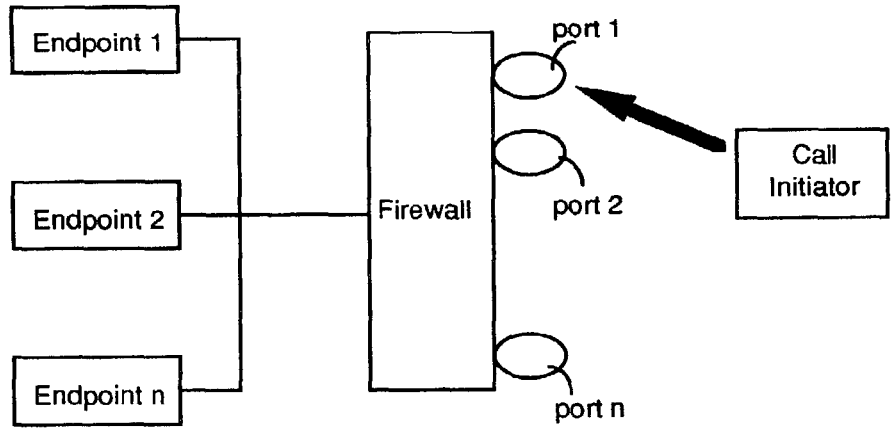
FIG. 3 show a system configuration of a firewall of this invention that includes interface opened with multiple ports for receiving multiple incoming VoIP calls.

Methods and systems are described for an intelligent network protection gateway and network architecture. According to one embodiment a new and improved firewall interface configuration and processing scheme for a network protection gateway (NPG) is provided to manage packets transmission. The network protection gateway provides both network layer and application layer protection, and through their content-aware proxy architecture, understand and parse VoIP packets at the application layer, thereby solving the VoIP NAT traversal problem. In accordance with various embodiments of the present invention, the NPGs as disclosed herein maintain high level security while enabling VoIP call setup and call transmission at very high performance. The technologies as disclosed herein are thought to be useful in connection with supporting many types of current and future VoIP signaling protocols.

Reference will now be made in detail to various embodiments of the present invention. It will be understood that the disclosure is not intended to limit the invention to any particular embodiments. On the contrary, the invention is intended to cover alternatives, modifications and equivalents, which may be included within the spirit and scope of the disclosure and the attached claims. As will be appreciated by one of skill in the art, the present invention may be embodied as a method, data processing system or computer software program products. Accordingly, the present invention may take the form of data analysis systems, methods, analysis software and etc. Software written according to the present invention may be stored in some form of computer readable medium, such as memory, or hard-drive, CD-ROM. The software may be transmitted over a network and executed by a processor in a remote location. The software may also be embedded in the computer readable medium of hardware, such as a network gateway device or a network card.

Referring to FIG. 2, a flowchart will now be described to illustrate the processing steps carried out by a new firewall processor according to one embodiment of the present invention. According to embodiments of the present invention, bi-directional VoIP protocol traversal communication is facilitated without compromising security. According to the present example, the process begins (step 100) when a VoIP user of an internal network system protected by a firewall sends out VoIP packets (step 105) for VoIP communication. The firewall receives the IP packets and changes the source IP address and the source port number in the packet header to an external IP address as if the packets have been originated by the firewall (step 110) and changes the port number to a port number designated by the firewall (step 115). The firewall then checks whether the IP packets are VoIP packets (step 120). If the packets are determined to be VoIP packets, then the firewall also changes the end point addresses and port numbers embedded in the packets to the new IP address, e.g., the external firewall IP address and the new port number, i.e., the new port number as designated by the firewall, to identify the sender of the message as an internal network user (step 125). After the embedded end point address and port number are changed, the VoIP packets are sent out (step 130) and the processes end (step 135). The end point IP address and the port number in the VoIP requests embedded in the IP packets are now consistent with the header of the IP packets. In this manner, the firewall provides correct IP address and port designations for a VoIP message receiver to respond to the message sender. The VoIP message receiver responds to the message sender by sending the responsive VoIP packets to the firewall according to the port number designated by the firewall. The difficulty described above is therefore resolved by allowing a message sender protected by a firewall to communicate with a message receiver with correct and consistent end point address information without being affected by the Network Address Translation (NAT) operation of the firewall.

In order to receive the inbound VoIP network communications, embodiments of the present invention provide new and improved firewall configurations to enable the recognition of the internal host's IP addresses that are hidden from the public network. Referring to FIG. 3, a block diagram of a firewall will now be described according to one embodiment of the present invention. As shown in the example of FIG. 3, the firewall may provide many ports on its external interface(s). Each port/IP pair corresponds to one end point in the internal network. The relationship of port/IP pair and endpoint address can be advertised automatically to a third computer on the network through a directory system, or it can be manually input into both the firewall and the external call manager. Thus, when the external caller wants to initiate a call to the end point inside, it will make a call to the specific IP/port pair on the firewall instead. The firewall will then use the same technique described above, to change the packet header and the content, so that the VoIP traffic can traverse the firewall. Embodiments of the present invention thus allow multiple calls to multiple end points behind the firewall. Embodiments of the present invention thus extend the capabilities of the firewall from a single port management scheme to a firewall capable of managing multiple incoming VoIP calls by providing multiple ports on the firewall interfaces. Each of these ports is mapped to an internal endpoint, so that multiple VoIP calls to multiple endpoints inside the firewall are now completely manageable by the firewall.

Figure 4:
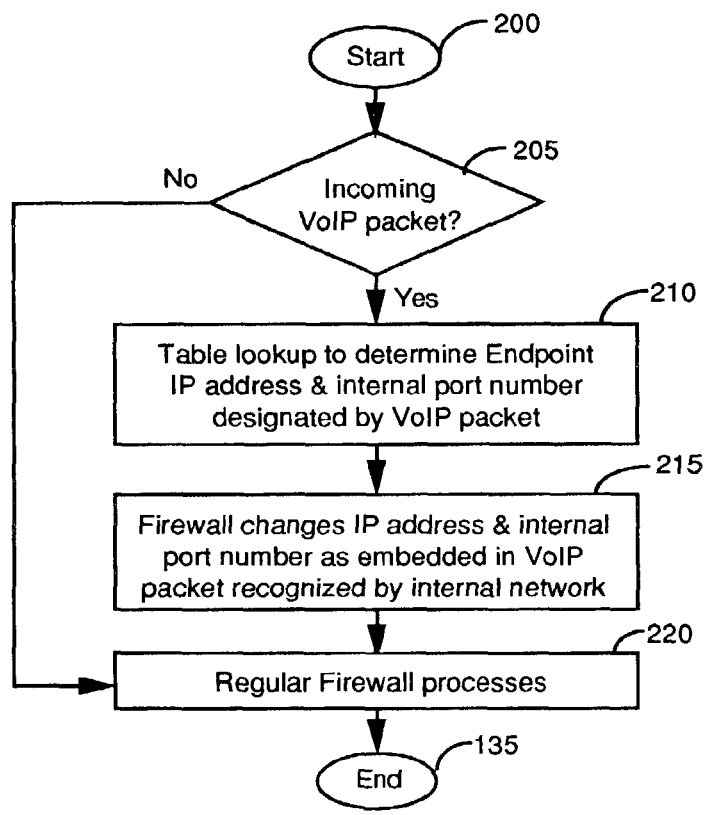
FIG. 4 is a flow chart showing the processing steps carried out by a firewall to direct multiple incoming VoIP calls to end points with correct internal IP addresses and port numbers.

Referring to FIG. 4, processing steps carried out by a firewall will now be described for managing an incoming IP packet according to one embodiment of the present invention. According to the present example, the process begins (step 200) by checking if an incoming packet is a VoIP packet (step 205), if it is not, then regular firewall processes of the packet are performed (step 220). If the incoming IP packet is a VoIP packet, then a table lookup process is carried out to identify an end point IP address and the internal port number that matches with the port number designated by the incoming VoIP packet (step 210). The firewall then changes the IP address and the port number of the VoIP request embedded in the IP packet to be consistent with the end point IP address and port number as recognized by the internal network (step 215). The firewall then carries out further regular firewall processes on the VoIP packet (step 220) before the firewall processes are ended (step 230).

Example 1 as described below provides a specific implementation according to one embodiment of the present invention. The Example is provided to further illustrate a network protection gateway (NPG) that applies an intelligent VoIP-aware network address translation (NAT) solution while enabling comprehensive network protection functions in a single unit. The intelligent NPG of the example is implemented as an application specific integrated circuit (ASIC)-based real-time anti-virus protection, connection filtering, firewall, VPN, intrusion detection, and traffic-shaping device. The comprehensive intelligent NPG takes advantage of an "application-aware" feature of the device to implement the techniques disclosed, such as "VoIP-aware" NAT services.

EXAMPLE 1

The device of this Example recognizes H.323 messages based on the standard port 1720-port address and parses the body of H.323 messages When it recognizes specific H.323 messages that carry the RTP/RTCP addresses, the NPG device creates the IP/Port mapping for the RTP traffic, which allows proper identification and address mapping of the RTP media stream between the calling and called devices in the private IP space and call host or IP gateways in the public space. It is assumed that a person of ordinary skill in the art possesses moderate level of knowledge of VoIP, RTP, H.323, H.225.0, H.245, VoIP's deployment in an enterprise network, and basic NAT technology.

The Core Intelligence of the NGP Device: H.323 Message Parsing

The processes of H.323 message parsing and translation of a typical Microsoft "Netmeeting session" setup is described. A Netmeeting uses the H.323 protocol for signaling and data transmission. VoIP calls through an IP PBX operate in a slightly different but similar fashion.

Figure 5A:
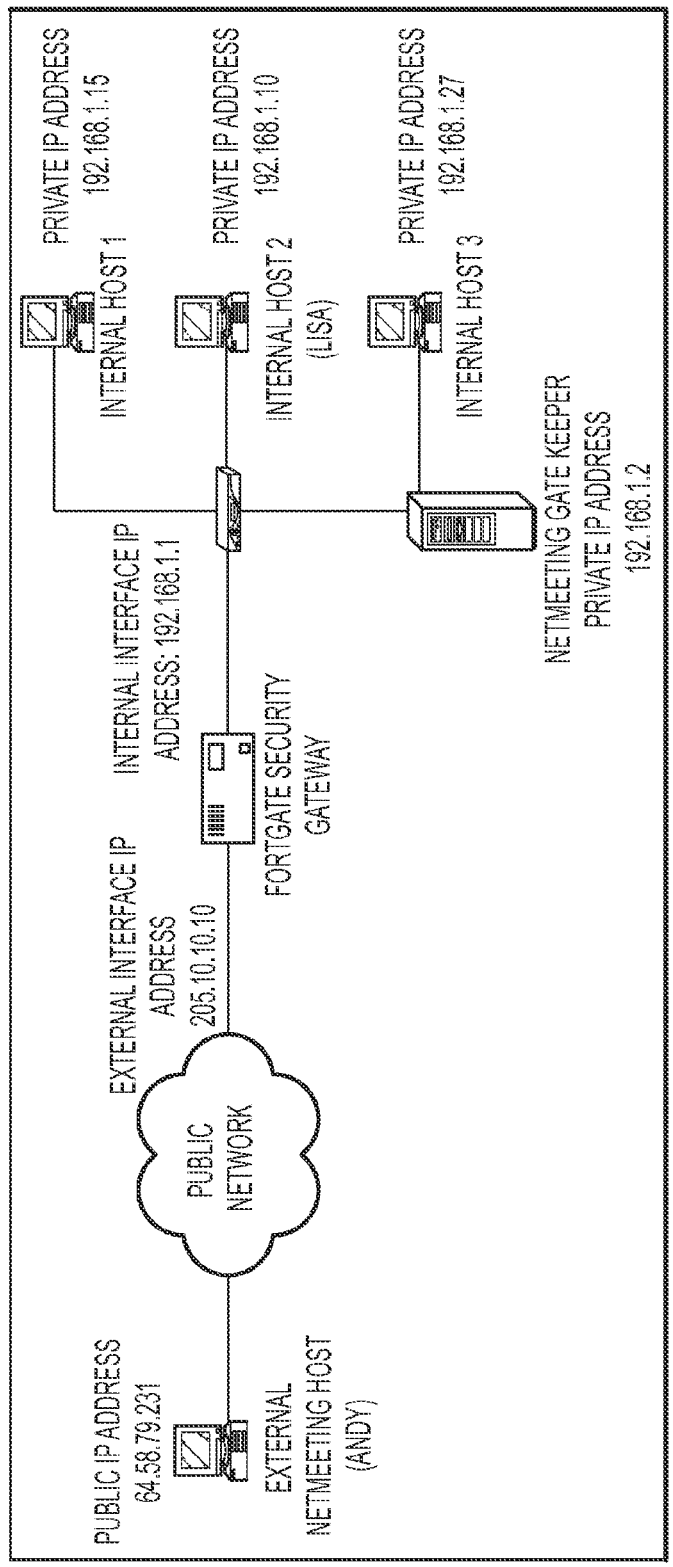

FIG. 5A shows the network topology involved in the example Netmeeting session. In the middle sits a NPG device shown as a "FortiGate Security Gateway" provided by Fortinet, Inc., which acts as a network protection gateway between the external network ("Public Network" as it is called in the diagram) and the internal network, which has multiple local hosts (named Internal Host 1 through 3 in the diagram). For convenience, the Internal Host 2 is named as "Lisa". Also sitting on the private network protected by the FortiGate NPG is the NetMeeting "Gatekeeper" server.

Introduction to the H.323 Gatekeeper

The Gatekeeper (GK) is used in the context of the H.323 protocol (and is used in other media control protocols as well). The GK is considered the "brains" of an H.323 signaling system. Typically, a GK is required when more than one local host needs to receive or initiate VoIP calls or host/participate in Netmeeting sessions. The Gatekeeper keeps a registration table where the private IP addresses of the local hosts are mapped to the "Alias" of that particular local host. In a Netmeeting session, an Alias is used to identify a party involved in a call. In the present example, assuming the email addresses of the users of the internal hosts are used in Netmeeting to uniquely identify the participants, the table that the GK keeps will look like the following:

| Local Host Private IP | User Alias | Other User Information |
|---|---|---|
| 192.168.1.15 | doug.smith@lebeis.com | ... |
| 192.168.1.10 | Lisa.Kelly@lebeis.com | ... |
| 192.168.1.27 | Joe.han@lebeis.com | ... |
| ... | | |

Note that an assumption is made that the e-mail addresses of three users, i.e., doug.smith@lebeis.com, lisa.Kelly@lebeis.com, and joe.han@lebeis.com are using the three machines on the local network as illustrated in the above chart. On receiving an H.323 related message directed to it by the FortiGate gateway, the Gatekeeper will use the above mapping table to direct the message to the appropriate local host based on the User Alias value, which is used in the Netmeeting session as an identifier of a person to call. The table in the Gatekeeper is empty when no Netmeeting client has been started on the local network. Note that if multiple Gatekeepers are deployed across a company's WAN, they synchronize between themselves for registered user information. Gatekeepers communicate with end points (local hosts in this case) using a protocol called RAS, or Registration, Admission, and Status. RAS is a straightforward protocol used by endpoints to register with a Gatekeeper for the purposes of call setup with another H.323 endpoint. In our example, as soon as a user, let's say, Lisa, starts her Netmeeting client on her local host 192.168.1.10, her private IP address and her User Alias (stored in the Netmeeting client) lisa.kelly@lebeis.com will be entered into the gatekeeper's table.

The following descriptions explain the entire process of Netmeeting setup using H.225.0, a sub-protocol of the 11.323 protocol designed for call setup and teardown. Eight steps are described in FIG. 5B that constitute the initial part of the Netmeeting setup process. An analysis of the eight steps highlights the problems are involved in VoIP NAT traversal, and shows how the FortiGate content-aware packet and content stream inspection according to the techniques disclosed in this invention solves the problem to allow VoIP traffic to traverse the barriers generated by the NAT process.

In the example, it is assumed that Andy, the external user, is hosting a Netmeeting session. Andy has a public IP address of 64.58.79.231. Andy's email address is andy.huang@external.com Lisa Kelly will be joining the Netmeeting session from behind the FortiGate gateway.

The Call Model of H.323

The H.323 call model supports many methods for setting up and routing calls, such as direct point-to-point (no Gatekeeper), point-to-point with routing via a Gatekeeper, multipoint, etc. This example examines the "Gatekeeper routed" model in the context of a point-to-point Netmeeting call through H.323.

The call model of H.323 consists of five phases:
1. Call setup (Phase A)
2. Initial communication between endpoints and terminal capability exchange (Phase B)
3. Establishment of audio and/or visual communication between endpoints (Phase C)
4. Request and negotiation of Call Services (Phase D)
5. Call termination (Phase E)

In the following descriptions, the initial stage of Phase A and part of Phase C are described to illustrate the potential problems VoIP call setup/data transmission currently experience and show how the embodiments of the present invention seek to alleviate the problems.

H.323 Case Study, Phase A: Call Setup

Step 1: User Registration in the Gatekeeper Through RAS

Figure 5B:
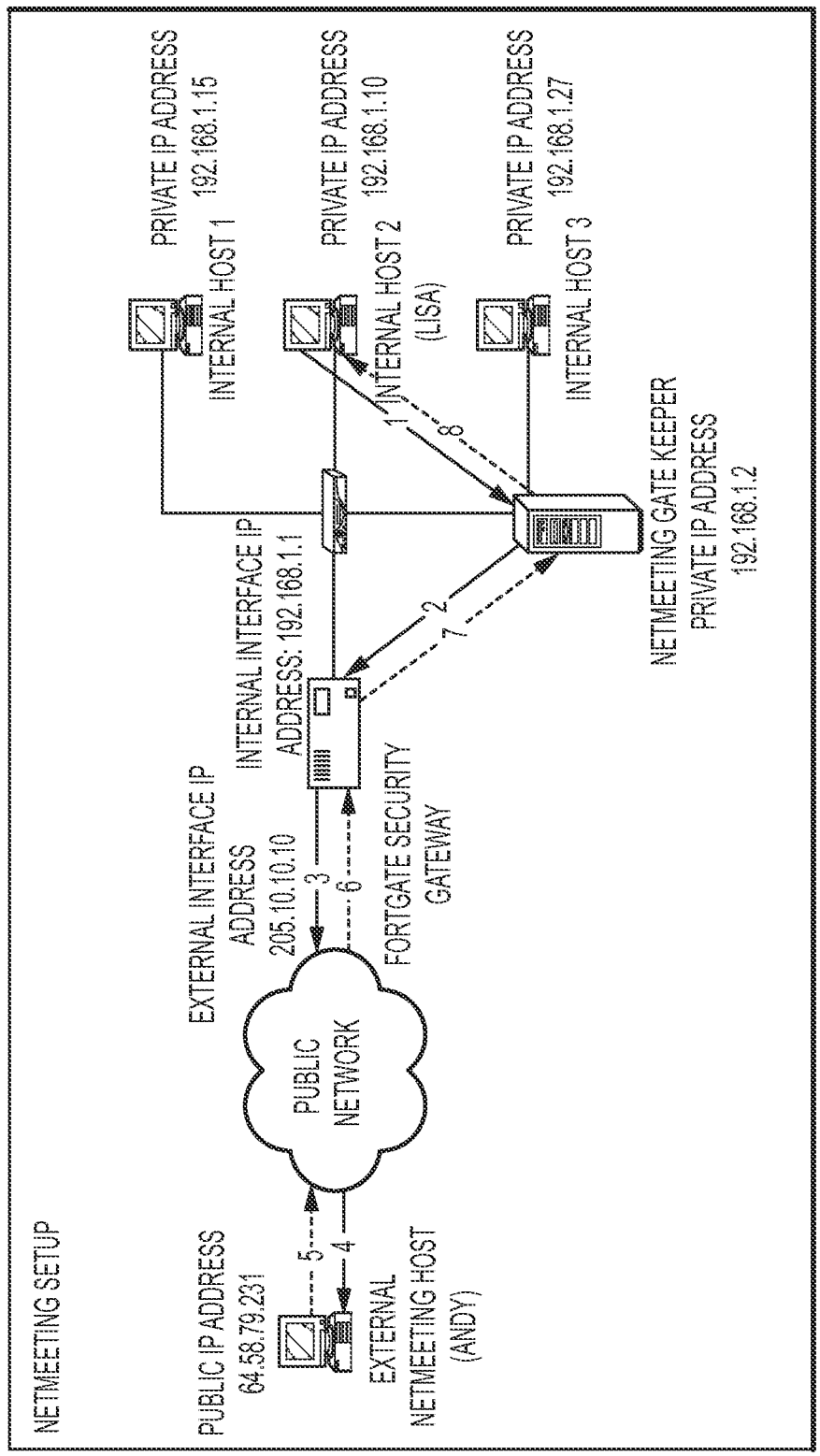
Figure 5C:
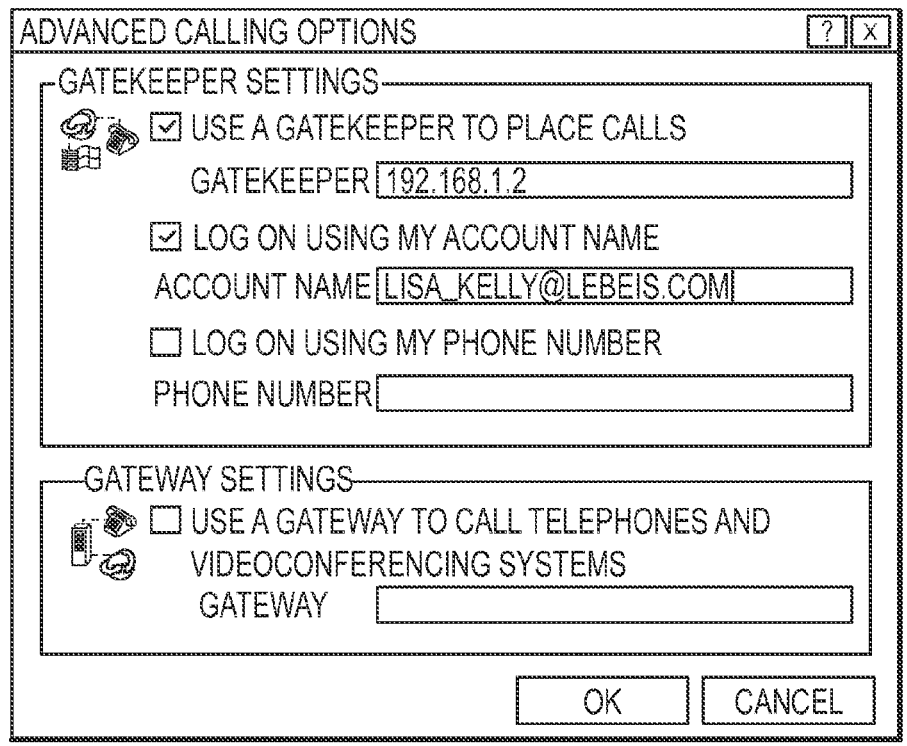

Referring to FIG. 5B, the initial stage of the call set-up processes will now be described in accordance with one embodiment of the present invention. As discussed earlier, to join the Netmeeting hosted by Andy Huang, Lisa opens the Netmeeting client. Earlier, she enabled the "Advanced Calling Options/Use a Gatekeeper to Place a Call" in the Netmeeting client, where she entered 192.168.1.2, or the private IP address of the Gatekeeper on her local area network through which her Netmeeting packets will be routed as shown in FIG. 5C. The table in the gatekeeper will then add the mapping between Lisa's private IP address to her alias (lisa.Kelly@lebeis.com) as a new entry. This process is completed through UDP protocol and port 1719.

Figure 5D:
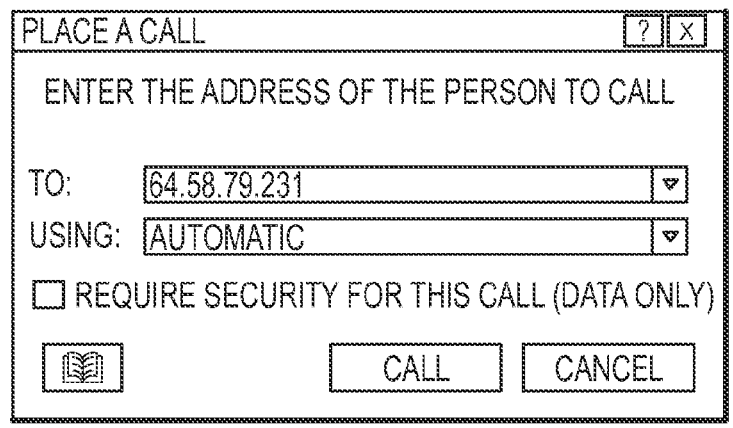

Once Lisa starts the Netmeeting client (which in the background causes her to be registered onto the Gatekeeper), she types in Andy's public IP address (64.58.79.231), which is used to find him as shown in FIG. 5D, and clicks on "Call". What happens in the background is that Lisa's Netmeeting sends a H.225.0 call setup TCP packet to the Gatekeeper. Note that Lisa's Netmeeting client is set up in such a way that all the call related packets (call setup, call data transmission, call teardown, etc.) will be routed to the Gatekeeper before being relayed to the network gateway connected to the external network. The TCP packet looks like that shown in FIG. 5E. The source IP address shows Lisa's private IP and the destination IP shows Andy's public IP address; the destination port is 1720, the H.225.0 call setup port that must be open on Andy's machine. Note also that in the message body, there is information about the Source IP and the Source Port—Andy, as the Netmeeting host will be using the this information in the message body to reply to Lisa to try to setup the call. This constitutes the first major VoIP NAT traversal problem that will be described in step 2. Lisa's alias is also embedded in the message body for future use.

Step 2: Call Setup Failure Using a Conventional NAT Gateway

In the present example, the Gatekeeper is pre-configured to have 192.168.1.1, or the internal IP address of the FortiGate gateway as its default gateway to the Internet. All packets it receives from the internal hosts will be relayed to the FortiGate unit (except for the initial caller registration information).

If the FortiGate of the present example handled NAT like a conventional firewall, the FortiGate unit would translate all internal host IP addresses into a public address (typically the external interface IP address of 205.10.10.10, or if an external IP address pool is available—into one of the addresses from the pool). The internal addresses, such as 192.168.1.10, are not routable outside of the internal network.

A security gateway, such as a conventional firewall that understands and translates only the header of the packets, will change the packet as that shown in FIG. 5F. Note that the source IP and the Source Port numbers have been changed from their original internal host (Lisa's) into the external IP address of FortiGate (205.10.10.10); similarly, the Port number may or may not be changed (in this case, it's changed from 2427 into 10000). Note the Source IP and Source Port in the message body are not touched because conventional firewalls don't look beyond packet headers. The problem arises when Andy's Netmeeting application tries to talk to Lisa to set up the call—remember as mentioned earlier it is the Source IP and Source Port embedded in the message body that will be used to locate the host at the other end of Andy's Netmeeting call. Andy's application will then try to send a TCP packet back to destination address 192.168.1.10 with destination port=2427. This packet will be lost because the address 192.168.1.10 is not routable outside of Lisa's internal network. The result—the reply packet sent by Andy will be lost and the Netmeeting call attempt will be aborted. In essence, the VoIP NAT traversal problem arises because the media transmission and signaling protocols, such as H.323, Session Initiation Protocol (SIP), Media Gateway Control Protocol (MGCP) and MegaCo, make extensive use of the information embedded in the message body in packets rather than relying exclusively on the packet header for routing. Conventional firewalls understand and process only the header with network address translation and don't touch the message body. Consequently, the other side of the media session will be using the wrong information to route its reply and communication attempts will fail.

Step 2 Revisited: Call Setup Success Using a FortiGate Gateway Configured in Accordance with an Embodiment of the Present Invention In this example, the FortiGate unit's application-aware NAT technology avoids the problems experienced using a conventional, network-level NAT solution. The FortiGate unit receives the TCP Netmeeting call setup packet from the Gatekeeper, and by parsing the message, recognizes the H.323 call setup request. As a result, besides the normal network address translation that FortiGate unit performs on every outgoing packet, it performs a "message body address translation" as well by replacing the source IP and source port in the message body with an externally routable IP and port number, as illustrated in FIG. 5G. According to one embodiment, all the above processing is completed within the proprietary purpose-built FortiOS™ operating system kernel and therefore latency introduced as a result of the packet parsing is negligible.

Steps 3, 4, 5, and 6: Andy Receives and Responds to the Call Setup Request

Once the header-level NAT is completed together with the address translation in the message body, the call setup request (TCP packet destined towards Andy's port 1720) will be sent to the external network that FortiGate is connected to and routed to Andy's machine at public IP address 64.58.79.231. Andy's machine is listening on port 1720 for call setup requests. It picks up the setup request from Lisa, removes the header, and looks into the message body to pick out the Source IP and Source Port from there. It understands that the Lisa can be reached at Source IP address 205.10.10.10 (which is the external interface address of FortiGate) and at port 10000. It also understands that Lisa is called on her in Netmeeting by her Alias lisa.Kelly@lebeis.com. It then sends a TCP call setup reply back to Lisa as illustrated in FIG. 5G: The reply gets routed through the public network and arrives at the FortiGate external interface.

Steps 6-7-8: The FortiGate Unit and Gatekeeper Implement Intelligent H.323 Call Setup When the call setup reply arrives at the FortiGate unit's external interface, several things happen:

1. The FortiGate unit parses all incoming packets and recognizes the H.225.0 call setup reply packet by looking at the header of the TCP packet—all Source Port=1720 packets are by design H.225.0 call setup packets.

2. The FortiGate implements "Port Forwarding,"—in this case it has been configured to route all packets with a Source port=1720 to the Gatekeeper.

3. The Gatekeeper, on receiving the packet, understands that the packet is for call setup and is a reply from the host of the Netmeeting session. The Gatekeeper parses the message and understands that the call participant's alias is lisa.kelly@lebeis.com. It then looks it up in its mapping table and finds the private IP for Lisa at 192.168.1.10. The reply packet is then relayed onto Lisa's machine.

4. Once the call setup reply from Andy arrives at Lisa's machine and is appropriately processed, the initial H.225.0 call setup is completed.

The Processes for Andy to Call in as A Participant and Lisa to Host a Netmeeting:

Up until now, it has been assumed in the example that Lisa calls out to join Andy's Netmeeting. What if Lisa hosts a Netmeeting and Andy calls in to join? In this situation, all that needs to be done according to one embodiment is to turn on the H.323 support in the FortiGate gateway—the same as when it is desired to enable Lisa to call out. No port will have to be permanently opened in the firewall to enable Andy's request to get through.

When Andy initiates a Call setup request to join Lisa's meeting the request TCP packet will arrive at the FortiGate gateway with a destination port of 1720. The FortiGate unit will use port address forwarding to redirect the packet to the Gatekeeper, which will in turn forward it onto Lisa's host (based on Lisa's alias of lisa.kelly@lebeis.com) for further processing. Lisa's reply will be going through similar address and port translation as described above. This way security is not jeopardized while incoming calls are allowed.

H.323 Case Study, Phase C: H.323 Establishment of Media Communication—H.245 Logical Channel Setup Once the initial call setup is completed, both sides can exchange information to set up the Master/Slave status in the call and also tell each other what kind of capabilities (video, audio, etc.) are available on both sides. The next stage would be to set up the logical channel for RTP, or Real Time Protocol, which carries the voice and/or video channels. The most important part in logical channel setup is the port address exchange so that both sides know which port to direct the media traffic to in media transmission. As before, a step-by-step analysis highlights the relevant FortiGate operations that facilitate the port setup process.

Steps 1, 2, and 3: Lisa Initiates a Logical Channel Setup Message

RTP is the protocol used in H.323 for media data transmission, including both video and audio. Logical channel setup focuses on exchanging UDP port information to the parties involved in the call to set up the port for media data exchange. This process is accomplished through the H.245 protocol, a sub-protocol in H.323. In this example, Lisa sends a logical channel setup UDP packet to Andy. The packet is illustrated in FIG. 5I. Note that the message body carries the source IP address as well as the port address to be used for RTP data transmission. Similar to Phase A in Call Setup, without appropriate replacement of the IP and Port in the message body, Andy won't know the appropriate port number for Lisa and therefore the media data transmission piece won't go through. This would be the case if a conventional NAT/firewall were used, and thus the call would fail.

The FortiGate unit configured in accordance with an embodiment of the present invention inspects both the header and message body of packets, and through its proprietary masquerading function, it will generate an IP address/Port pair that will be used to replace the Source IP/Source Port in the message body as well as in the header. The mapping will be entered into its mapping table as illustrated in FIG. 5J. The UDP packet after the translation is illustrated in FIG. 5K. This new packet carrying translated address and port information will then be sent to Andy. Note that the ports that opened for the media transmission session will be opened only for the duration of the session and will be dynamically closed immediately after the session is over. This eliminates the severe security vulnerabilities that are introduced when pre-defined ports are left open permanently, as is often the case using conventional NAT firewalls.

Steps 4, 5, 6: Andy's Netmeeting Client Responds to Lisa's Logical Channel Setup Request On receiving Lisa's logical channel setup request, Andy's Netmeeting Client will respond by sending a reply carrying its own port address, and will send the packet to address 205.10.10.10 and port 10000 as indicated in Lisa's message body. The response will travel across the public network and arrive at the FortiGate gateway.

Steps 7, 8: Andy's Response Intelligently Routed to Lisa

Once the response arrives at FortiGate, it will use the mapping table to translate it into the Private IP as well as the private port address corresponding to Lisa's machine and Netmeeting application. Similar to Phase A Call setup, using port address forwarding the logical channel setup response from Andy will then be forwarded to the Gatekeeper, which will relay (without further processing) the response to the correct port on Lisa's machine, thus completing the logical channel setup process and enabling a secure VoIP session.

According to Example 1, a firewall is disclosed that is an application aware firewall provided for detecting outgoing VoIP packets. In one embodiment, the firewall is an application aware firewall provided for detecting outgoing VoIP packets based on a standard port address. In another embodiment, the firewall further includes an external VoIP interface for mapping an e-mail address included in an incoming VoIP message to an internal port number in the internal network. In another embodiment, the firewall further includes an external VoIP interface for coordinating with the VoIP processing means for conducting a network meeting between an external network user and at least two internal network users. In another embodiment, the firewall further includes an external VoIP interface for coordinating with the VoIP processing means for conducting a network meeting between an internal network user and at least two external network users.

Embodiments of the present invention further provide a network protection gateway device that has an application awareness means for recognizing a VoIP message and a VoIP processing means for parsing and processing the VoIP message for enabling a protected bi-direction VoIP communication.

In one embodiment, the NPG further includes an application specific integrated circuit (ASIC) for implementing the network protection gateway therein.

Embodiments of the present invention further provide a method for transmitting a VoIP packet from an internal network through a firewall to an external network comprising a step of detecting an outgoing VoIP packet sent from the internal network for changing data in a header of the VoIP packet and also changing data contents in the VoIP packet corresponding to data changed in the header to enable a bi-directional VoIP communication. In accordance with one embodiment, the step of changing the data in the header of the VoIP packet comprises a step of changing a source IP address and a port number in the header of the VoIP packet and the step of changing the data contents in the VoIP packet further comprises a step of changing the data contents in the VoIP packet corresponding to the source IP address and the port number changed in the header to enable a bi-directional VoIP communication. According to one embodiment, the method further includes a step of providing a plurality of VoIP ports to an external VoIP interface for receiving multiple incoming VoIP packets each designated with one of the VoIP ports; and identifying an internal address in the internal network corresponding to the VoIP port designated in each of the incoming VoIP packets for directing each of the incoming VoIP packets to the internal address identified. In one embodiment, the method further includes a step of mapping an e-mail address included in an incoming VoIP message to an internal port number in the internal network. In another embodiment, the method further includes a step of conducting a network meeting between an external network user and at least two internal network users. In another embodiment, the method further includes a step of conducting a network meeting between an internal network user and at least two external network users.

Therefore, according to embodiments of the present invention Network Protection Gateways (NPGs) are specifically designed to provide the application-level intelligence and ASIC-accelerated performance required for secure Internet telephony and mixed voice/data applications. In one embodiment, NPG supports secure VoIP services for any size company—from SOHO users through large enterprises and service providers—and enables any organization to take full advantage of the benefits of converged voice/data applications.

Although the present invention has been described in terms of various specific embodiments, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

What is claimed is:

1. A method comprising:
    providing, by a firewall interposed between an internal network and an external network, network-layer protection against unauthorized access by hosts associated with the external network to a plurality of internal hosts associated with the internal network by performing network address translation (NAT) processing of Internet Protocol (IP) addresses associated with the plurality of internal hosts;
    providing, by the firewall, application-layer protection from the external network on behalf of the plurality of internal hosts by processing one or more signaling protocols associated with one or more Voice over IP (VoIP) sessions, including
        distinguishing among VoIP packets and non-VoIP packets,
        inspecting the VoIP packets within an operating system kernel of the firewall, and
        performing content-aware NAT within the operating system kernel by changing data in headers of the VoIP packets and also changing data contents in the VoIP packets corresponding to data changed in the headers to enable bi-directional VoIP communications among one or more of the plurality of internal hosts and one or more of the hosts associated with the external network;
    providing a plurality of VoIP ports to an external VoIP interface of the firewall;
    receiving by the external VoIP interface incoming VoIP packets each having associated therewith a user alias and an indication regarding one of the plurality of VoIP ports;
    causing each of said received multiple incoming VoIP packets to be directed to an appropriate internal host of the plurality of internal hosts by performing by the firewall port address forwarding based on the port indication to an H.323 gatekeeper, a Session Initiation Protocol (SIP) server or a Media Gateway Control Protocol (MGCP) media gateway within the internal network that maintains a mapping of user aliases to private addresses of the plurality of internal hosts.

2. The method of claim 1 wherein the user alias comprises an email address of a user associated with one of the plurality of internal hosts.

3. The method of claim 1 wherein the firewall comprises an intelligent network protocol gateway.

4. The method of claim 1, wherein said changing data in headers of the VoIP packets further comprises changing a source IP address and a port number in the headers of the VoIP packets.

5. The method of claim 1, wherein said distinguishing among VoIP packets and non-VoIP packets is based on a standard port address.

6. The method of claim 1, further comprising conducting through the external VoIP interface a network meeting between an external network user and at least two internal network users.

7. The method of claim 1, further comprising conducting through the external VoIP interface a network meeting between an internal network user and at least two external network users.

8. The method of claim 1, further comprising implementing said firewall as an application specific integrated circuit (ASIC).

9. An intelligent network protection gateway device comprising:
- a network address translation (NAT) processing means, configured to be interposed between an internal network and an external network, for providing network-layer protection against unauthorized access by hosts associated with the external network to a plurality of internal hosts associated with the internal network by performing translation of Internet Protocol (IP) addresses associated with the plurality of internal hosts;
- an application-layer protection means, for protecting the plurality of internal host from the external network by processing one or more signaling protocols associated with one or more Voice over IP (VoIP) sessions, including
  - distinguishing among VoIP packets and non-VoIP packets,
  - inspecting the VoIP packets within an operating system kernel of the application-layer protection means, and
  - changing data in headers of the VoIP packets and also changing data contents in the VoIP packets corresponding to data changed in the headers within the operating system kernel to enable bi-directional VoIP communications among one or more of the plurality of internal hosts and one or more of the hosts associated with the external network;
- an external VoIP interface including a plurality of VoIP ports configured to receive incoming VoIP packets each having contained therein an a user alias and an indication regarding one of the plurality of VoIP ports;
- wherein said external VoIP interface further comprises a means for directing the incoming VoIP packets to an appropriate internal host of the plurality of internal hosts by performing port address forwarding based on the port indication to an H.323 gatekeeper, a Session Initiation Protocol (SIP) server or a Media Gateway Control Protocol (MGCP) media gateway within the internal network that maintains a mapping of user aliases to private addresses of the plurality of internal hosts;
- wherein one or more of said NAT processing means and said application-layer protection means includes (i) logic implemented within an application specific integrated circuit (ASIC) of the intelligent network protection gateway device or (ii) a program storage device readable by one or more processors of the intelligent network protection gateway device, tangibly embodying a program of instructions executable by the one or more processors.

10. The intelligent network protection gateway device of claim 9 wherein the user alias comprises an email address of a user associated with one of the plurality of internal hosts.

11. The intelligent network protection gateway device of claim 9 wherein the mapping maps an e-mail address included in an incoming VoIP message to an internal port number in said internal network.

12. The network protection gateway device of claim 9, wherein said distinguishing among VoIP packets and non-VoIP packets is based on a standard port address.

13. The network protection gateway device of claim 9, wherein the external VoIP interface facilitates network meetings among an external network user and at least two internal network users.

14. The network protection gateway device of claim 9, wherein the external VoIP interface facilitates network meetings among an internal network user and at least two external network users.

15. An intelligent network protection firewall comprising:
- a firewall processor configured to be interposed between an internal network and an external network and to provide network-layer protection against unauthorized access by hosts associated with the external network to a plurality of internal hosts associated with the internal network by performing network address translation (NAT) processing of Internet Protocol (IP) addresses associated with the plurality of internal hosts, the firewall processor further configured to provide application-layer protection from the external network on behalf of the plurality of internal hosts by processing one or more signaling protocols associated with one or more Voice over IP (VoIP) sessions, including
  - distinguishing among VoIP packets and non-VoIP packets,
  - inspecting the VoIP packets within an operating system kernel of the firewall processor, and
  - performing content-aware NAT within the operating system kernel by changing data in headers of the VoIP packets and also changing data contents in the VoIP packets corresponding to data changed in the headers to enable bi-directional VoIP communications among one or more of the plurality of internal hosts and one or more of the hosts associated with the external network;
- an external VoIP interface, providing a plurality of VoIP ports, configured to receive incoming VoIP packets each having associated therewith a user alias and an indication regarding one of the plurality of VoIP ports and to direct the incoming VoIP packets to an internal host of the plurality of internal hosts by performing port address forwarding based on the port indication to an H.323 gatekeeper, a Session Initiation Protocol (SIP) server or a Media Gateway Control Protocol (MGCP) media gateway within the internal network that maintains a mapping of user aliases to private addresses of the plurality of internal hosts.

16. The intelligent network protection firewall of claim 15 wherein the user alias comprises an email address of a user associated with one of the plurality of internal hosts.

17. The intelligent network protection firewall of claim 15 wherein the mapping maps an e-mail address included in an incoming VoIP message to an internal port number in said internal network.

18. The intelligent network protection firewall of claim 15, wherein the firewall processor is configured to distinguish among VoIP packets and non-VoIP packets based on a standard port address.

19. The intelligent network protection firewall of claim 15, wherein the external VoIP interface facilitates network meetings among an external network user and at least two internal network users.

* * * * *